(12) United States Patent
Shigematsu et al.

(10) Patent No.: US 8,864,117 B2
(45) Date of Patent: Oct. 21, 2014

(54) FIBER-REINFORCED PLASTIC SPRING

(75) Inventors: Ryohei Shigematsu, Yokohama (JP); Miho Nakazono, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 2 days.

(21) Appl. No.: 13/696,331

(22) PCT Filed: May 9, 2011

(86) PCT No.: PCT/JP2011/060651
§ 371 (c)(1),
(2), (4) Date: Nov. 6, 2012

(87) PCT Pub. No.: WO2011/142315
PCT Pub. Date: Nov. 17, 2011

(65) Prior Publication Data
US 2013/0049273 A1 Feb. 28, 2013

(30) Foreign Application Priority Data

May 14, 2010 (JP) ................................. 2010-111675

(51) Int. Cl.
*F16F 1/18* (2006.01)
*B32B 5/26* (2006.01)
*B60G 11/02* (2006.01)
*F16F 1/368* (2006.01)

(52) U.S. Cl.
CPC ............ *B60G 11/02* (2013.01); *B60G 2202/11* (2013.01); *B32B 2307/50* (2013.01); *B32B 5/26* (2013.01); *B32B 2260/023* (2013.01); *B60G 2206/7101* (2013.01); *B32B 2250/20* (2013.01); *B32B 2605/00* (2013.01); *F16F 1/368* (2013.01)
USPC ............. 267/158; 267/36.1; 267/47; 267/148

(58) Field of Classification Search
USPC ........... 264/136, 258, 263; 267/158, 30, 36.1, 267/37.1, 37.2, 47, 49, 50, 148
See application file for complete search history.

(56) References Cited

U.S. PATENT DOCUMENTS 3,204,944 A * 9/1965 Brownyer ....................... 267/47
4,519,591 A * 5/1985 Bush et al. ..................... 267/148
(Continued)

FOREIGN PATENT DOCUMENTS

EP 0 202 218 A1 11/1986
EP 0 445 620 A2 9/1991
(Continued)

OTHER PUBLICATIONS

International Search Report issued in International Patent Application No. PCT/JP2011/060651 mailed Aug. 9, 2011.
(Continued)

*Primary Examiner* — Pamela Rodriguez
(74) *Attorney, Agent, or Firm* — Oliff PLC

(57) ABSTRACT

A fiber reinforced plastic spring which enables prevention of breakage caused by compressive stress is provided, including a FRP spring that has a laminated structure having plural fibers which are different from each other in tensile modulus of elasticity and are laminated. An upper surface of the FRP spring is a surface to which a pulsating bending load is applied. An upper side region of each laminated structure is a compressive stress region at which compressive stress is generated. A lower side region of each laminated structure is a tensile stress region at which tensile stress is generated. Distribution of tensile modulus of elasticity of each laminated structure is asymmetric with respect to the neutral axis.

3 Claims, 2 Drawing Sheets

(56) References Cited

U.S. PATENT DOCUMENTS

| | | | | |
|---|---|---|---|---|
| 5,087,503 A | * | 2/1992 | Meatto | 428/162 |
| 6,012,709 A | | 1/2000 | Meatto et al. | |
| 6,660,114 B2 | * | 12/2003 | Meatto et al. | 156/64 |
| 6,679,487 B2 | * | 1/2004 | Meatto et al. | 267/148 |
| 2003/0178756 A1 | | 9/2003 | Meatto et al. | |

FOREIGN PATENT DOCUMENTS

| | | | |
|---|---|---|---|
| GB | 1 333 558 | | 10/1973 |
| JP | A-55-54737 | | 4/1980 |
| JP | A-57-110838 | | 7/1982 |
| JP | A-59-34036 | | 2/1984 |
| JP | 63-225738 A | * | 9/1988 |
| JP | A-3-81022 | | 4/1991 |
| JP | A-7-77231 | | 3/1995 |
| JP | A-2001-523793 | | 11/2001 |

OTHER PUBLICATIONS

Aug. 20, 2014 European Search Report issued in European Application No. 11780572.1.

* cited by examiner

FIBER-REINFORCED PLASTIC SPRING

TECHNICAL FIELD

The present invention relates to a fiber reinforced plastic spring to which pulsating bending load is applied. In particular, the present invention relates to a prevention technique to prevent breakage caused by compressive stress.

BACKGROUND ART

For example, in an automotive field, springs (volute springs, spiral springs, leaf springs, and the like), to which pulsating bending load is applied, are used, and in these springs, weight reduction and space saving are required. For example, it is proposed that fiber reinforced plastic springs (hereinafter simply referred to as "FRP springs") be used instead of metallic springs in order to realize weight reduction.

For example, technique of Patent Document 1 discloses an FRP tapered leaf spring as an FRP spring. In this technique, glass fiber or carbon fiber is impregnated into plural pieces of sheet which are different from each other in length, and the plural pieces of sheet are laminated, so that an FRP tapered leaf spring is produced. Technique of Patent Document 2 discloses an FRP leaf spring as an FRP spring. In this technique, a leaf center portion is made of carbon fiber, and a leaf surface portion is made of glass fiber, so that a flexible FRP tapered leaf spring is produced.

Patent Document 1 is Japanese Examined Patent Application Publication No. Hei 3-81022, and Patent Document 2 is Japanese Unexamined Patent Application Publication No. Hei 7-77231.

DISCLOSURE OF THE INVENTION

Problems Solved by the Invention

As shown in FIG. 4, when a pulsating bending load P is applied to a leaf spring 51 supported by a supporting portion 52, a compressive stress is generated in an upper surface of load application side, and a tensile stress is generated in a lower surface of a side opposite to the load application side. Reference symbol S denotes a neutral axis positioned at a center of thickness direction of the leaf spring 51. When a metallic leaf spring is used as the spring 51, fatigue fracture may occur from a tensile stress side surface. When an FRP leaf spring is used as the spring 51, breakage may occur from a compressive stress side surface. For example, as shown in FIG. 5, when a carbon fiber reinforced plastic spring (CFRP spring) having a single layer structure is used as an FRP spring, and pulsating bending load (load in an arrow direction in FIG. 5) is applied to the CFRP spring, fracture may occur at a compressive stress side surface. Due to this, density of energy which can be used may be substantially small.

However, in FRP springs, techniques for prevention of breakage occurring from compressive stress side surface have not been developed. For example, in the technique of Patent Document 1, and each of the laminated plural pieces of sheet are made of the same fiber, techniques for prevention of breakage occurring from a compressive stress side surface are not disclosed. In the technique of Patent Document 2, the flexible FRP tapered leaf spring is disclosed, but compressive characteristics of fiber are not focused on. The leaf surface portion is made of glass fiber, and it is not efficient that glass fiber, which has tensile strength lower than that of carbon fiber, be provided at the leaf surface portion at which stress is higher.

An object of the present invention is to provide a fiber reinforced plastic spring which enables prevention of breakage caused by compressive stress.

Means for Solving the Problems

According to one aspect of the present invention, a fiber reinforced plastic spring (hereinafter simply referred to as "FRP spring"), to which pulsating bending load is applied, includes: a laminated structure having plural fibers which are different from each other in tensile modulus of elasticity and are laminated, wherein distribution of tensile modulus of elasticity of the laminated structure is asymmetric with respect to a neutral axis.

In the above aspect of the present invention, the tensile modulus of elasticity is a value obtained by using curved line of relation between tensile stress and strain and by using the following relation equation (see FRP Design Handbook (in Japanese), published by Japan Reinforced Plastic Society (JRPS) in 1979). Regarding the curved line of relation between tensile stress and strain, first straight line portion (straight line portion which is included in the curved line and passes through the origin or tangent line which is tangent to the curved line at the origin).

$$E_m = \Delta\sigma/\Delta\epsilon$$

Reference symbol $E_m$ denotes tensile modulus of elasticity (unit: $N/mm^2$), reference symbol $\Delta\sigma$ denotes tensile difference between two points of straight line portion by average cross sectional area before applying of load (unit: $N/mm^2$), and reference symbol $\Delta\epsilon$ denotes strain difference between the two points of the straight line portion.

In the FRP spring of the above aspect of the present invention, distribution of tensile modulus of elasticity of the laminated structure is set to be asymmetric with respect to the neutral axis, so that the tensile modulus of elasticity of the one surface layer portion of surface layer portions at both sides parallel to the neutral axis is lower than that of another surface layer portion.

In a case in which one surface layer portion side having the lower tensile modulus of elasticity is disposed at a surface side at which compressive stress is generated when pulsating bending load is applied, the fiber of the surface layer portion side has the lower tensile modulus of elasticity and can be easily bent. Thus, it is difficult for breakage (fracture or the like) due to buckling to occur at the compressive stress side surface. Therefore, breakage stress of the entire spring can be higher, so that in the spring, density of energy which can be used can be greater than a spring of metallic material (spring steel or the like), an FRP spring having a single layer structure, and an FRP spring having a distribution of tensile modulus of elasticity which is symmetric with respect to a neutral axis.

The FRP spring of the above aspect of the present invention can use various structures. According to a desirable embodiment of the present invention, the fiber reinforced plastic spring may have a surface layer portion of compressive stress generation region, a neutral axis portion, and a surface layer portion of tensile stress generation region, and a tensile modulus of elasticity of the surface layer portion of the compressive stress generation region may be the lowest, and a tensile modulus of elasticity of the surface layer portion of the tensile stress generation region may be lower than that of the neutral axis portion. In this embodiment, the fibers, which are different from each other in tensile modulus of elasticity, can be laminated in accordance with stress distribution of the FRP spring to which pulsating bending load is applied. Therefore, breakage stress of the entire spring can be much higher, so that in the spring, density of energy which can be used can be much greater.

According to another desirable embodiment of the present invention, in the distribution of tensile modulus of elasticity, the tensile modulus of elasticity may be lower from the neutral axis to a surface in a step-by-step manner. In this embodiment, the tensile modulus of elasticity can more finely correspond to the stress distribution of the FRP spring to which pulsating bending load is applied. Therefore, breakage stress of the entire spring can be much higher, so that in the spring, density of energy which can be used can be much greater.

Effects of the Invention

According to the present invention, breakage stress of the entire spring can be higher, so that in the spring, density of energy which can be used can be greater than a spring of metallic material (spring steel or the like), an FRP spring having a single layer structure, and an FRP spring having a distribution of tensile modulus of elasticity which is symmetric with respect to a neutral axis.

BRIEF DESCRIPTION OF DRAWINGS

FIG. 2A is a side cross sectional diagram which shows a three-layer structure thereof, and FIG. 2B is a side cross sectional diagram which shows a five-layer structure thereof.

EXPLANATION OF REFERENCE NUMERALS

Figure 1A:
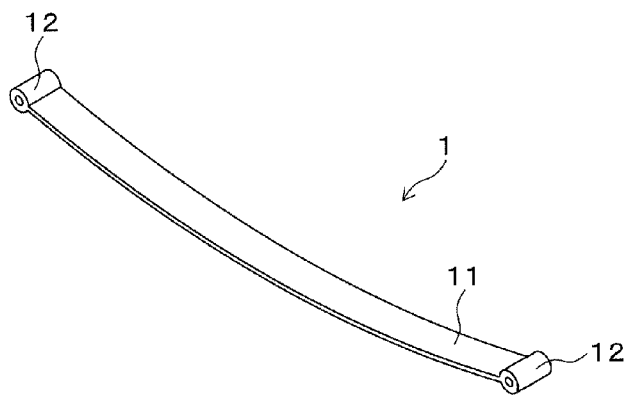
FIGS. 1A and 1B are a perspective view and a side surface diagram which show a structure of a fiber reinforced plastic spring of an embodiment according to the present invention.

Reference numeral 1 denotes a FRP spring (fiber reinforced plastic spring), reference numeral 20 and 30 denote a laminated structure, reference numeral 21 and 31 denote a first layer (surface layer portion of tensile stress generation region), reference numeral 22 denotes a second layer (neutral axis portion), reference numeral 33 denotes a third layer (neutral axis portion), reference numeral 23 denotes a third layer (surface layer portion of compressive stress generation region), reference numeral 35 denotes a fifth layer (surface layer portion of compressive stress generation region), and reference symbol S denotes a neutral axis.

BEST MODE FOR CARRYING OUT THE INVENTION (1) Structure of Embodiment

Figure 1B:
Figure 2A:
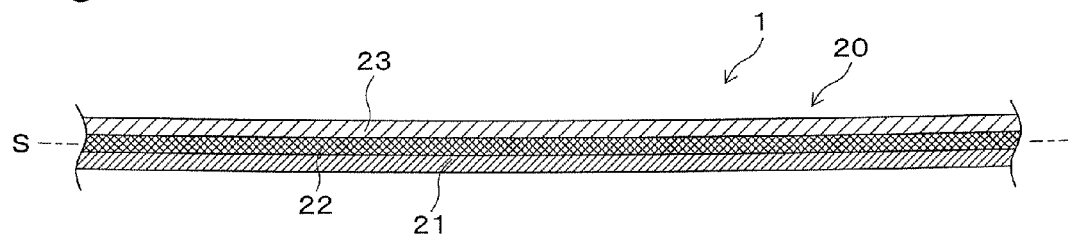
FIGS. 2A and 2B show a structure of a portion of laminated structure of a fiber reinforced plastic spring.
Figure 2B:
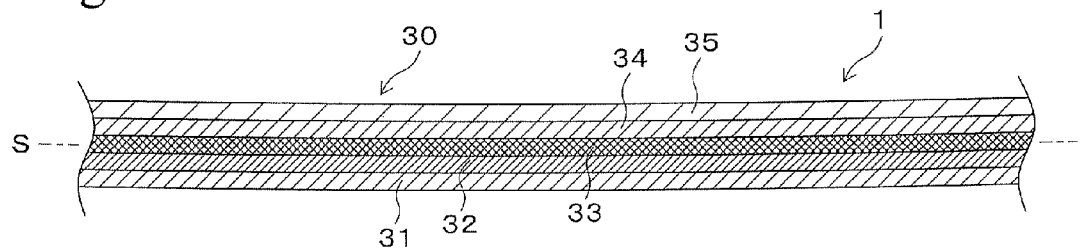
Figure 4:
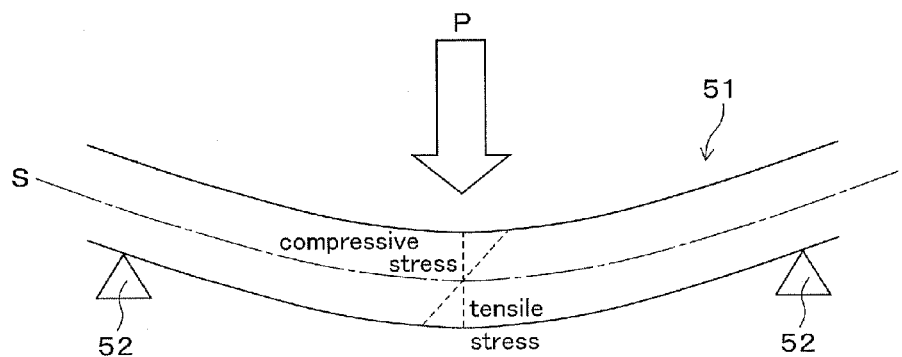
FIG. 4 is a diagram for explaining a stress distribution in a fiber reinforced plastic spring when pulsating bending load is applied to the fiber reinforced plastic spring.
Figure 5:
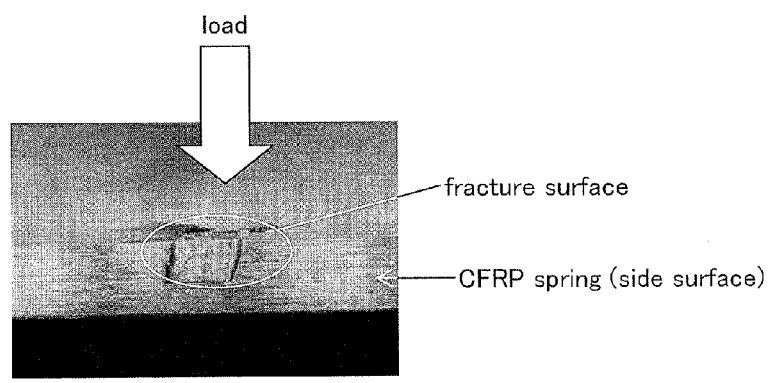
FIG. 5 is a photograph which shows a breakage condition of a CFRP spring having a single layer structure when pulsating bending load is applied to the CFRP spring.

One embodiment of the present invention will be explained hereinafter with reference to Figures. FIGS. 1A and 1B are a perspective view and a side surface diagram which show a structure of a fiber reinforced plastic spring 1 (hereinafter simply referred to as "FRP spring 1") of an embodiment according to the present invention. FIGS. 2A and 2B show a structure of a portion of laminated structure of a FRP spring 1. FIG. 2A is a side cross sectional diagram which shows a three-layer structure thereof, and FIG. 2B is a side cross sectional diagram which shows a five-layer structure thereof. In FIGS. 2A and 2B, reference symbol S denotes a neutral axis positioned at a center of thickness direction of the FRP spring 1. In FIGS. 1A to 2B, an upper surface of the FRP spring 1 is a surface to which pulsating bending load (reference symbol P in FIG. 4) is applied, an upper side region of laminated structure, which is upper with respect to the neutral axis S, is a compressive stress region at which compressive stress is generated, and a lower side region of laminated structure, which is lower with respect to the neutral axis S, is a tensile stress region at which tensile stress is generated.

For example, the FRP spring 1 is a leaf spring having a leaf portion 11 and eye portions 12. The FRP spring 1 has a laminated structure having plural fibers which are different from each other in tensile modulus of elasticity (tensile elastic modulus) and which are laminated. Distribution of tensile modulus of elasticity of the laminated structure is asymmetric with respect to the neutral axis S. For example, it is desirable that a tensile modulus of elasticity of surface layer portion of compressive stress generation region be the lowest, and a tensile modulus of elasticity of surface layer portion of tensile stress generation region be lower than that of a neutral axis portion.

For example, a laminated structure 20 shown in FIG. 2A is a three-layer structure in which a first layer 21, a second layer 22, and a third layer 23, which are different from each other in tensile modulus of elasticity, are laminated in turn. The first layer 21 is a surface layer portion of tensile stress generation region, and tensile modulus of elasticity of the first layer 21 is lower than that of the second layer 22. The second layer 22 is a neutral axis portion at which the neutral axis S is positioned. The third layer 23 is a surface layer portion of compressive stress generation region, and tensile modulus of elasticity of the third layer 23 is the lowest of the layers of the laminated structure 20. Regarding specific example of tensile modulus of elasticity, the tensile modulus of elasticity of the first layer 21 can be set at 250 GPa, the tensile modulus of elasticity of the second layer 22 can be set at 395 GPa, and the tensile modulus of elasticity of the third layer 23 can be set at 234 GPa.

For example, a laminated structure 30 shown in FIG. 2B is a five-layer structure in which a first layer 31, a second layer 32, a third layer 33, a fourth layer 34, and a fifth layer 35, which are different from each other in tensile modulus of elasticity, are laminated in turn. In the laminated structure 30, the distribution of tensile modulus of elasticity is formed more finely than in the laminated structure 20, and the tensile modulus of elasticity more finely changes so as to be lower from the neutral axis portion to the surface layer portion in a step-by-step manner.

The first layer 31 is a surface layer portion of tensile stress generation region, and tensile modulus of elasticity of the first layer 31 is lower than that of the third layer 33. The second layer 32 has a tensile modulus of elasticity which is an intermediate value between tensile moduli of elasticity of the first layer 31 and the third layer 33. The third layer 33 is a neutral axis portion at which the neutral axis S is positioned. The fourth layer 34 has a tensile modulus of elasticity which is an intermediate value between tensile moduli of elasticity of the third layer 33 and the fifth layer 35. The fifth layer 35 is a surface layer portion of compressive stress generation region, and tensile modulus of elasticity of the third layer 35 is the lowest of the layers of the laminated structure 30. In this manner, the tensile modulus of elasticity is lower from the third layer 33 to the first layer 31, the tensile modulus of elasticity is lower from the third layer 33 to the fifth layer 35, and the tensile modulus of elasticity of the third layer 35 is the lowest of the layers of the laminated structure 30. The distribution of tensile modulus of elasticity more finely corresponds to stress distribution of the laminated structure 30.

In order that each of the laminated structures 20 and 30 have the above distribution of tensile modulus of elasticity, fiber of each layer is appropriately selected. Reinforcement fibers (a carbon fiber, a glass fiber, an aramid fiber (a Kevlar fiber), a boron fiber, and the like) can be used as the fiber. Polyacrylonitrile (PAN) fibers and pitch fibers can be used as the carbon fiber.

(2) Production Method of Embodiment

Figure 3:
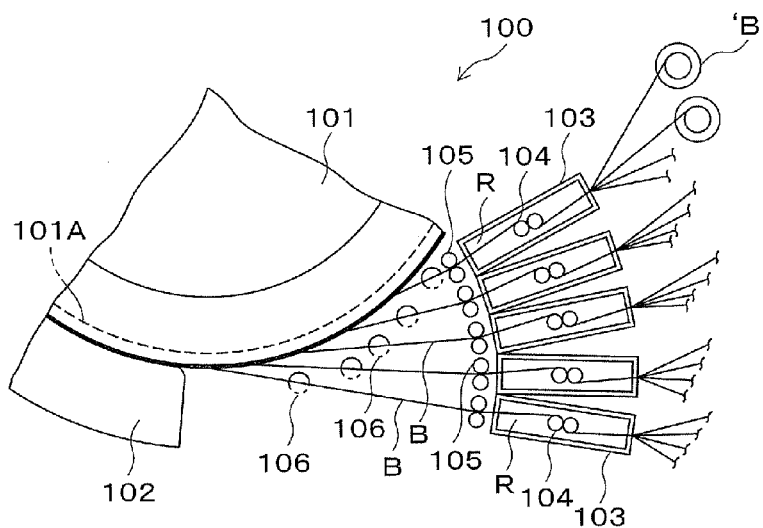
FIG. 3 is a diagram which shows a structure of a portion of an apparatus used in a production method for a fiber reinforced plastic spring of an embodiment according to the present invention.

A production method for the FRP spring 1 will be explained with reference to FIG. 3. FIG. 3 is a diagram which shows a structure of a portion of an apparatus 100 used in a production method for the FRP spring 1. The apparatus 100 uses a filament winding method. The apparatus 100 is equipped with a forming die 101 which winds a roving B by rotation. The roving B is supplied from a roving ball 'B. The roving B is a reinforcement fiber bundle. On the forming die 101, a forming groove 101A, of which shape corresponds to a shape of FRP spring 1 and the like, is formed. A fixed die 102 is provided to the forming die 101 so as to face the forming die 101. The roving B is wounded to the forming die 101 after passing through a resin impregnation tank 103 having a resin R provided therein.

In resin impregnation tanks 103, tensile modulus of elasticity of reinforcement fiber of the roving B is changed every resin impregnation tank 103 which the roving B passes through. For example, tensile modulus of elasticity of reinforcement fiber of the roving B, which passes through the resin impregnation tank 103 positioned at the uppermost side in FIG. 3, is set at a highest value. For example, tensile modulus of elasticity of reinforcement fiber of the roving B, which passes through the resin impregnation tank 103 positioned at the undermost side in FIG. 3, is set at a lowest value. For example, the tensile moduli of elasticity of reinforcement fibers of the rovings B are lower in turn from the upper side resin impregnation tank 103 in FIG. 3 to the lower side resin impregnation tank 103 in FIG. 3.

Reference numeral 104 denotes a tension adjustment device which provides optimum tension to the roving B. Reference numeral 105 denotes a flow volume adjustment device which extracts excess resin impregnated into the roving B. Reference numeral 106 denotes a forming width adjustment device used when width of leaf spring to be formed is changed in a longitudinal direction.

In the above structured apparatus 100, the roving B passes through the resin impregnation tank 103, and the resin R is impregnated into the roving B. Next, the roving B having the resin R impregnated thereinto is wound to the forming die 101, and this is cured by heating and is integrally formed. Thus, a FRP spring 1 is obtained. In this embodiment, the resin impregnation tank 103 to be used is appropriately changed depending on tensile modulus of elasticity of each layer of laminated structures 20 and 30 of the FRP spring 1 to be formed, and the roving B to be wounded to the forming die 101 is selected, so that the laminated structures 20 and 30 having a desired distribution of tensile modulus of elasticity can be obtained.

The production method for the FRP spring 1 is not limited to the above method, and it can be modified in various manners. For example, each prepreg in which a resin is impregnated into a reinforcement fiber (for example, carbon fiber) can be disposed as each layer of laminated structure of the FRP spring 1. Specifically, plural prepregs to be used for a laminated structure are produced. In this case, the prepregs are different from each other in tensile modulus of elasticity of carbon fiber of prepreg. These prepregs are disposed so that the FRP spring 1 has a desired distribution of tensile modulus of elasticity. The resin may be thermosetting or thermoplastic.

As described above, in this embodiment, each distribution of tensile modulus of elasticity of the laminated structures 20 and 30 is set to be asymmetric with respect to the neutral axis S. Thus, the tensile modulus of elasticity of the one surface layer portion (each layer 23 and 35) of surface layer portions at both sides parallel to the neutral axis S is lower than that of another surface layer portion (each layer 21 and 31). In a case in which the one surface layer portion (each layer 23 and 35) having the lower tensile modulus of elasticity is disposed at the surface side at which compressive stress is generated when pulsating bending load (reference symbol P in FIG. 4) is applied, the fiber of each layer 23 and 35 has the lower tensile modulus of elasticity and is easily bent. Thus, it is difficult for breakage (fracture or the like) due to buckling to occur at the compressive stress side surface. Therefore, breakage stress of the entire spring 1 can be greater, so that in the spring 1, density of energy which can be used can be larger than a spring of metallic material (spring steel or the like), an FRP spring having a single layer structure, and an FRP spring having a distribution of tensile modulus of elasticity which is symmetric with respect to a neutral axis.

In particular, regarding the asymmetric distribution of tensile modulus of elasticity, the tensile modulus of elasticity of each layer 23 and 35 which is the surface layer portion of the compressive stress generation region is the lowest, and the tensile modulus of elasticity of each layer 21 and 31 which is the surface layer portion of the tensile stress generation region is lower than that of each layer 22 and 33 which is the neutral axis portion. Thus, the fibers, which are different from each other in tensile modulus of elasticity, are laminated in accordance with the stress distribution of the FRP spring 1 to which pulsating bending load is applied. Therefore, breakage stress of the entire spring 1 can be much higher, so that in the spring 1, density of energy which can be used can be much greater.

The invention claimed is:

1. A fiber reinforced plastic spring, to which pulsating bending load is applied, comprising:
    a laminated structure having plural fibers which are different from each other in tensile modulus of elasticity and are laminated,
    a surface layer portion of a compressive stress generation region, a neutral axis, a neutral axis portion, and a surface layer portion of a tensile stress generation region, wherein
    a distribution of tensile modulus of elasticity of the laminated structure is asymmetric with respect to the neutral axis, and
    a tensile modulus of elasticity of the surface layer portion of the compressive stress generation region is the lowest.

2. A fiber reinforced plastic spring according to claim 1, wherein the tensile modulus of elasticity of the surface layer portion of the tensile stress generation region is lower than that of the neutral axis portion.

3. A fiber reinforced plastic spring according to claim 1, wherein
in the distribution of tensile modulus of elasticity, the tensile modulus of elasticity is lower from the neutral axis to a surface in a step-by-step manner.

* * * * *